Dec. 24, 1968  L. K. RHODES  3,417,417
SCRUBBING IMPLEMENT
Filed April 18, 1966
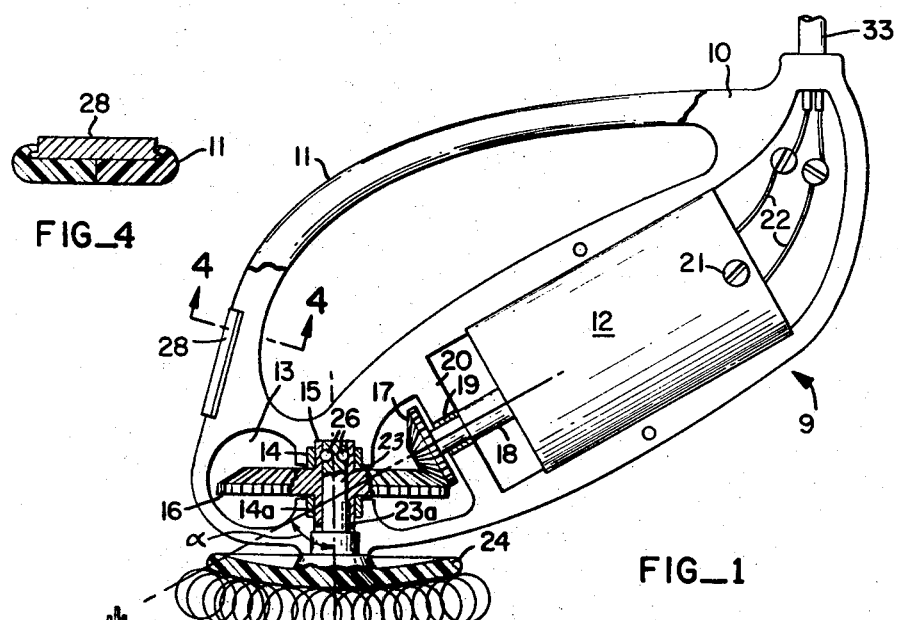
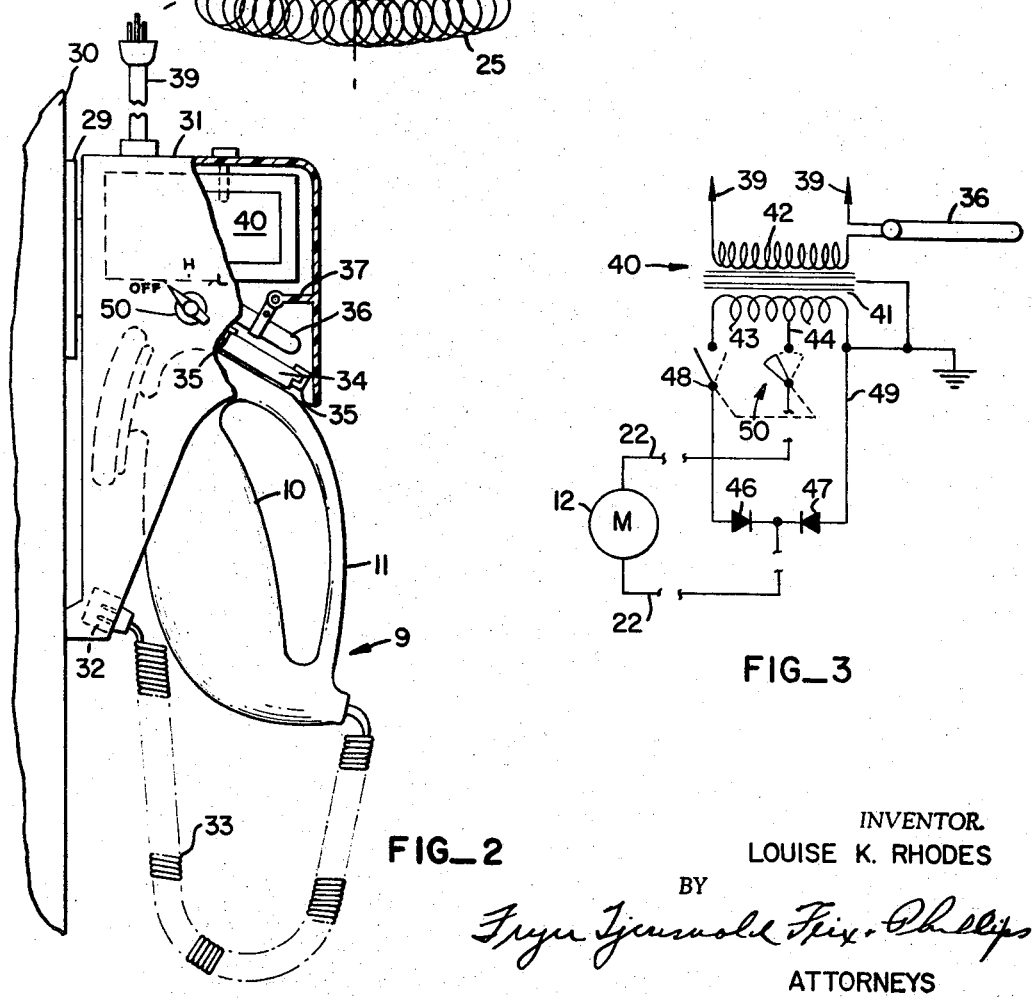
INVENTOR.
LOUISE K. RHODES
BY
*Fryer Tjensvold Fix-Phillips*
ATTORNEYS United States Patent Office 3,417,417
Patented Dec. 24, 1968

3,417,417
SCRUBBING IMPLEMENT
Louise K. Rhodes, 6835 E. Prairie Road,
Lincolnwood, Ill. 60645
Filed Apr. 18, 1966, Ser. No. 543,413
4 Claims. (Cl. 15—93)

ABSTRACT OF THE DISCLOSURE

A line-powered scrubbing implement having a waterproof elongated body with a raised handle extending between its ends and an angularly disposed rotating scrubbing element mounted at one of its ends is employed in combination with a housing for stowage of the implement which includes a proximity operated switching means controlling line voltage to a transformer therein which turns "on" or "off" the line voltage to the transformer automatically when the scrubber is removed from or returned to the housing. This arrangement completely and automatically isolates the line voltage, making the scrubber safe for employment in kitchen sinks and the like.

This invention relates to a powered scrubbing implement having a driven element carrying a pad for scouring kitchen utensils and the like for cleaning the same.

During the preparation of food for human consumption, many utensils are soiled with greasy carbonaceous deposits and other undesirable stains which are difficult to remove from the utensils. Commonly such soils and stains are removed by hand-scouring with abrasive pads, or the like. Such a stain and soil removal process is both time-consuming and unpleasing as a task.

If a powered scrubbing instrument is to replace the laborious hand-scouring, it must be suitable for use in a water environment and even for submerging therein while cleaning the utensils, and yet be completely safe for the operator to use. Further, it must be shaped so that its scrubbing element is easily manipulated by the operator and so that it may be positioned for working in corners and areas of limited access, both inside and outside the utensils when the situation demands. This means the implement should be small and compact, but yet the implement must have adequate power for accomplishing the necessary scouring, especially when the operator bears down on an implement to remove a resisting stain or soil.

Accordingly, it is an object of this invention to provide a powered scrubbing implement for removing stains and soil from kitchen utensils which is safe for the operator to use in a water environment around wet, metallic fixtures.

Another object is the provision of a scrubbing implement which is compact and has a scrubbing element oriented to supply the maximum flexibility for reaching areas which are not readily accessible.

A specific object of the invention is the provision of a scrubbing implement and housing for storing it which automatically turns the implement "on" when it is removed from the housing, and "off" when the implement is returned to the housing, eliminating the necessity of manually manipulating switches.

Another and more specific object of the invention is the provision of a powered implement having a scrubbing element which is a convex disc to improve flexibility and which also provides for the attachment of replaceable scrubbing pads.

Other objects and advantages will be apparent in the description of the invention which follows, and those as well as the specific ones mentioned above can be accomplished by a powered, hand-manipulated scrubbing implement which comprises a waterproof, generally cylindrical body including a handle; a scrubbing element fixed to a scrubber shaft for rotation therewith, said shaft being rotatably mounted on one end of said cylindrical body; an electric motor mounted within said body and having its output shaft driving said scrubber shaft through gearing; and electrical circuit means for supplying power to said motor whereby the scrubbing element is driven for cleaning. Other objects will be accomplished by a combination of the scrubbing implement mentioned above and a holder with automatically operated switch means for controlling power to the implement when it is removed from or inserted into the holder.

The construction and operation of the scrubbing implement will be described with reference to the accompanying drawings wherein:

FIG. 1 is an elevation of the implement shown in section to disclose the internal detail;

FIG. 2 is an elevation on a reduced scale of the implement shown in FIG. 1 with a cooperating holder and having parts broken away to show the inter-relation of the parts;

FIG. 3 is a schematic of the circuit diagram for the preferred embodiment of the invention; and FIG. 4 is a section of the handle of the scrubbing implement taken along line 4—4 of FIG. 1.

Referring to FIG. 1, the scrubbing implement 9 has a generally cylindrical body 10 which has a handle 11, a recess adopted to receive an electric motor 12, and a toroidal cavity 13 at one end. The body is usually formed of plastic and in two halves which may be joined along the central medial of the body to facilitate the insertion of the motor and other parts. These two halves may be secured together with glue or bolts to form a watertight body when assembled. If bolts are used a gasket material should be placed between the halves. The handle is generally flat, as can be seen by the cross-section in FIG. 4, which given the operator a better gripping means for manipulating the unit.

Mounted in the body generally concentrically with the axis of the torus which defines the cavity 13 is a pair of metallic bearing sleeves 14 and 14a, which rotatably support the respective upper and lower ends of a socket 15 which is an integral part of bevel gear 16. Coacting with the bevel gear is a smaller driving bevel gear 17 that is fixedly mounted on the end of the output shaft 18 of the motor. This motor output shaft is journalled in a metallic bearing sleeve 19, mounted in wall 20 of the body defining one end of the recess for holding the motor. The motor is secured in the body by a screw 21 and fits snugly into the recess which prevents its rotation by the torque developed through the output shaft.

The speed of the motor output shaft 18 should be such that the socket is driven at approximately 200 to 600 r.p.m. This slow speed lessens the tendency of the throw water due to the rotation of the scrubbing head. Many motors which have internal gearing within the motor housing to reduce the output shaft speed are commercially available and may be used. The motor is powered through leads 22 by electrical power from an external source.

The socket 15 receives in axially sliding relationship the scrubber shaft 23 of the scrubbing element which further includes at its outer end a transverse disc 24 having a convex outer face. This face has detachably secured thereto a scrubbing pad 25. The inner end of the scrubber shaft 23 has a circumferential groove which receives a resilient means, such as a split metallic ring 26, which expands into a cooperating groove in the wall of the bore of socket and retains the shaft in the socket by its overlap between the respective grooves in the bore and shaft.

This arrangement permits the scrubbing element to be withdrawn from the implement when desired, and various other scrubbing elements, to be "snapped" into the implement to provide additional flexibility. A longer or shorter shaft may be used, and various shaped scrubbing heads likewise may be employed.

As can be seen in FIG. 1, any water entering the socket 15 cannot leave the socket and proceed into the toroidal cavity 13 since the bearings 14 and 14a provide a seal. The motor is further sealed from the ingress of water by bearing sleeve 19 which limits the access of water from the recess holding motor 12.

The inserted end of the scrubber shaft 23 is secured against rotation relative to the socket by a key 23a on the shaft, which is received in an axial groove in the wall of the bore of the socket 15. Other suitable means may be employed to prevent the relative rotation of the shaft to the socket, such as a square shaft or one having a non-circular cross-section.

From the above description and FIG. 1 it can be seen that the scrubbing disc 24 is located at one end of the cylindrical body and generally canted relative to the body. Actually, shaft 23 holding the scrubber disc 24 projects forwardly, away from the central body portion so its axis is angularly disposed relative to the axis of the cylindrical body so its shaft makes an acute angle $\alpha$, of approximately 60° with the axis of the cylindrical body, as can be seen in the drawings. In actual practice the angular relationship between shaft 23 and the axis of the cylindrical body can vary between 30° and 60° to orient the disc at the end of the implement advantageously for working in areas of limited access. The end of the cylindrical body and the angle of the bevel gears can be modified accordingly for the proper angular relationship.

The body has embedded therein near the scrubbing end thereof, a flat, metallic plate 28, such as iron, which will be strongly attracted by a magnet. In the preferred embodiment the plate is formed of a soft iron, which when brought near the magnetic field, has magnetism induced therein. This plate, which itself may be a permanent magnet, cooperates with a permanent magnet located in a holder (described below) for the implement, so that it can be easily taken in and out of the holder and yet will not fall therefrom, being retained therein by the magnetic attachment. Actually, the plate is embedded so that one of its largest surfaces is exposed in a position where it can be brought in contiguous relationship with the magnet in the holder for retention of the implement therein.

The holder shown in FIG. 2 includes a base plate 29 adapted to be fixed to a wall or similar structure 30, and a housing 31 which is closed at its top, sides and front, but is open at the bottom to permit the insertion of the scrubbing part of the implement when it is not in use. The holder also includes a disconnect fixture, such as socket 32, adapted to receive a plug connected to the end of a flexible electric cord 33 that forms part of the circuit supplying power to the motor within the scrubbing implement. The holder is usually mounted on a vertical surface, and the scrubbing implement is inserted through the bottom opening to bring the plate 28 embedded therein into close proximity with a magnet 34 fixedly mounted by brackets 35 in the upper portion of the housing. When the magnet and plate 28 have been pushed into contiguous relationship, the magnetic forces of attraction are sufficient to hold the implement's weight and retain it within the housing. Thus, when an operator wishes to use the scrubbing implement, he merely grabs the handle 11 and pulls downwardly overcoming the magnetic forces of attraction and freeing the scrubbing implement from the housing. This attachment eliminates the necessity for various catches and the like which could be used to retain the implement. Further, it allows any moisture retained on the scrubbing element of the implement to drain from the housing.

In the preferred embodiment of the invention a magnetically actuated switch 36 is held by a bracket 37 just above the magnet 34. The operation of this switch is controlled by the position of the implement with respect to the magnet. The magnetically operated switch is so positioned, and also is of the type that when the implement is removed from the housing the change in the magnetic flux around the magnet 34 will cause the switch to actuate to an "on" position. Conversely, when the implement is inserted into the housing, the change in magnetic flux, then passing through the plate 28, will be reduced sufficiently to cause the magnetically operated switch to go to an "off" position. Thus, it can be appreciated that when the implement is removed from the housing it will run, and when returned thereto it will stop automatically. This eliminates the necessity of a person working around grounded, wet kitchen fixtures and sinks from manipulating switches which could result in hazard shocks.

A line voltage of 110 volts A.C. is used as the source of electric power and the voltage is dropped through a transformer which is adequately grounded in order to reduce the electrical shock hazard to the user, having due regard to the fact that the implement will be used in or near moist, metallic sinks, faucets and other fixtures which provide an excellent ground. Further, the reduced voltage can be rectified and direct current for driving the scrubbing element to provide strong starting torques.

The circuit which is part of the preferred embodiment of the invention is shown in FIG. 3 wherein reference numerals 12, 22 and 36 are used to denote parts (therein shown schematically) previously described. The holder is equipped with a three wire line cord 39 which plugs into any appropriate outlet which has the proper facilities for the grounded lead, and provides power for the transformer 40 mounted within the holder. The transformer's core 41 as well as its secondary 43 are grounded to eliminate any hazard of electrical shocks to the user of the implement which is powered through the transformer.

The transformer has primary and secondary windings 42 and 43, the latter having a center-tap 44 and contains substantially fewer turns than the primary in order to achieve a reduced voltage. The primary of the transformer is connected to a source of line voltage through magnetic switch 36, and thus when the implement has been placed within the holder the transformer is disconnected from the power source as previously described. Obviously, when batteries are used in place of the transformer a magnetic switch can be likewise used to switch the implement "on" and "off." It should be appreciated that the magnetic actuated switch is on the line side (primary) of the transformer, and works completely automatically so that an operator will not need to suffer any hazard of switching line voltage "on" and "off" during operation of the implement, which could be dangerous in view of the environment in which the implement is to be employed.

In the preferred embodiment of the invention, the voltage of the secondary is rectified by two semiconductor diodes 46 and 47 by connecting leads 48 and 49 thereto, as shown in FIG. 3. In this manner it is possible to obtain a desired power, i.e. between 6 and 12 volts D.C. at 3 to 6 amps for driving the motor 12 of the implement.

In order to provide additional control a three-position, dual element switch 50 mounted in the housing 31 provides the operator with both speed and "off" control for the scrubbing implement. This switch is connected in the secondary, where generally only 6 to 12 volts are present, and therefore it is completely safe for the operator to manipulate since there is no danger of hazardous electric shocks. Actually, the switch has three positions—an "off" position which disables the center tap from supplying current to the motor 12, and a "high" and "low" on position. The low position cuts out one half of the rectification circuit (resulting in half wave rectification) thereby slowing the speed of the scrubbing implement. In this way, two speeds are available to the operator depending on the particular scouring application of the implement. Also the switch can be used to turn the implement to the "off" position when changing scrubbing elements or pads.

In operating the implement, cord 39 is connected to a suitable source of A.C. power when the implement is positioned within the holder as shown in FIG. 2. Under these circumstances a magnetic switch 36 is opened and no power is supplied to the primary winding 42 of the transformer. However, when the implement is withdrawn from the holder, the magnetic flux no longer passes through plate 28 and the change of flux about the magnet will influence the magnetic switch which causes the switch to close energize the primary. The alternating current passing through the primary of the transformer induces a lower voltage current in the secondary which is rectified by diodes 46 and 47 to provide direct current for the motor 12. With the implement withdrawn from the holder and with switch 50 in the high or low position, the scrubbing pad of the implement will be driven by its motor through the bevel gears and socket 15 and scrubber shaft 23.

When the scouring operation has been completed the implement is returned to the housing and the change in flux caused by the positioning of plate 28 against the magnet 34 will allow the magnetically actuated switch 36 to open, opening the circuit in the primary of the transformer.

The scrubbing head—including parts 23 to 25—can be readily removed from the holder for cleaning or replacement of the pad if desired by merely holding the handle 11 and pulling axially outboard along the shaft 23 to separate the head from the implement. In this manner various types of scrubbing heads may be inserted in the socket for special cleaning operations. Since the speed of the scrubber shaft is relatively slow, i.e. from 200 to 600 r.p.m., various types of heads may be used with the implement, such as wirebrush heads, polishing heads, etc. This feature makes the implement valuable as a flexible kitchen tool.

The location of the scrubbing head at one end of the cylindrical body and its angular disposition thereto allows the implement to be compact but still reach areas of limited access in utensils needing scouring. Further, the use of a magnetically actuated switch allows hazardous line voltage supplying the power to the implement to be completely isolated from the user of the implement, an important safety consideration.

I claim:
1. A safe line-powered scrubbing device for cleaning kitchen utensils comprising:
   (a) a waterproof elongated body having a raised handle connected between its ends and an electric motor encased therein,
   (b) shaft means angularly projecting from one end of said body having means to attach a scrubbing element thereto,
   (c) drive means interconnecting said shaft means with said electric motor,
   (d) a housing with an aperture for receiving a portion of said body having a transformer with a low voltage output, said housing having magnetically actuated switching means connected between the line and said transformer operable to disconnect said transformer from the line when a portion of said body is placed in said housing and to connect it to the line when such portion of said body is removed;
   (e) flexible cord means electrically connecting said low voltage output with said motor; and
   (f) magnetic material mounted in such portion of said body received in said housing whereby said switch means are automatically actuated by its proximity without physical contact of said body with said switch means.

2. The scrubbing device as defined in claim 1 wherein rectifying means are included between the low voltage output of the transformer and the motor.

3. The scrubbing device as defined in claim 1 wherein the magnetic material in said body forms part of a magnetic connection between said body and the housing for holding said body in the housing.

4. The scrubbing unit as defined in claim 1 wherein the scrubbing element includes a disc having a convex outer face, extending transversely to the scrubber shaft, and an abrasive pad detachably mounted on said disc for rotation therewith.

References Cited

UNITED STATES PATENTS

| | | | |
|---|---|---|---|
| 950,759 | 3/1910 | Weiner. | |
| 1,578,013 | 3/1926 | Case | 15—29 |
| 2,024,303 | 12/1935 | Obrig | 15—230.19 |
| 2,357,291 | 9/1944 | Smith | 15—22 X |
| 3,278,963 | 10/1966 | Bond | 15—22 |
| 2,474,899 | 7/1949 | Hutt | 200—61.41 X |

WALTER A. SCHEEL, *Primary Examiner.*

L. G. MACHLIN, *Assistant Examiner.*

U.S. Cl. X.R.

335—205; 200—61.41